United States Patent [19]

Hagner

[11] Patent Number: 4,793,704
[45] Date of Patent: Dec. 27, 1988

[54] PHOTOMETRIC CIRCUIT

[76] Inventor: Bo Hagner, Orrvägen 11, Täby, Sweden, 18251

[21] Appl. No.: 34,153
[22] PCT Filed: Jul. 4, 1986
[86] PCT No.: PCT/SE86/00325
  § 371 Date: Jan. 28, 1987
  § 102(e) Date: Jan. 28, 1987
[87] PCT Pub. No.: WO87/00271
  PCT Pub. Date: Jan. 15, 1987

[30] Foreign Application Priority Data

Jul. 5, 1985 [SE] Sweden .............................. 8503358

[51] Int. Cl.⁴ .............................................. G01J 1/44
[52] U.S. Cl. .............................. 356/226; 250/336.1; 250/370.01
[58] Field of Search .......... 250/338 R, 370 R, 370.14, 250/370 K, 336.1; 356/226, 228

[56] References Cited

U.S. PATENT DOCUMENTS

| 3,113,220 | 12/1963 | Goulding et al. | 250/370 |
| 3,379,094 | 4/1968 | Bertram | 356/226 |
| 3,381,147 | 4/1968 | Abraham | 356/226 |
| 3,418,473 | 12/1968 | Blue | 250/370 |

FOREIGN PATENT DOCUMENTS 540482 9/1973 Switzerland .
159580 7/1969 United Kingdom .

OTHER PUBLICATIONS

Wallmark et al, "Optoelektronik," (in Swedish), published 1981 by Studentlitteratur (Lund), p. 81.

Primary Examiner—Janice A. Howell
Assistant Examiner—William F. Rauchholz
Attorney, Agent, or Firm—Holman & Stern

[57] ABSTRACT

In an instrument for the detection of ultra-violet radiation, visible light or infrared radiation an electric coupling is known, which comprises a photo-diode of silicon or germanium, a measurement resistor, over which generated photo-electric current generates a voltage, and a voltmeter with low leakage current for measuring the voltage generated. For rendering possible a less expensive, simpler and safer structural design than the designs known and commercially available, it is proposed that the measurement resistor $R_A$ and the calibrated voltmeter V each are connected in parallel over the photo-diode.

1 Claim, 1 Drawing Sheet

PHOTOMETRIC CIRCUIT

CROSS REFERENCE TO RELATED APPLICATION(S)

This United States application stems from PCT International Application No. PCT/SE 86/00325 filed July 4, 1986.

BACKGROUND AND SUMMARY OF THE INVENTION

This invention relates to an electric circuit in an instrument for detecting ultra-violet radiation, visible light or infrared radiation, comprising a photo-diode of silicon or germanium, a precision resistor for measuring, via which generated photo-electric current from the photo-diode generates a voltage, and a voltmeter with low leakage current for measuring the voltage generated.

The present invention has as an object to render possible a structural design, which is less expensive, simpler and safer than the ones known and commercially available.

The invention is characterized in that the precision resistor and calibrated voltmeter each are connected in parallel with the photo-diode.

BRIEF DESCRIPTION OF THE DRAWINGS

The invention is described in the following with reference to the accompanying drawings, in which.

DETAILED DESCRIPTION OF THE INVENTION

Figure 1:
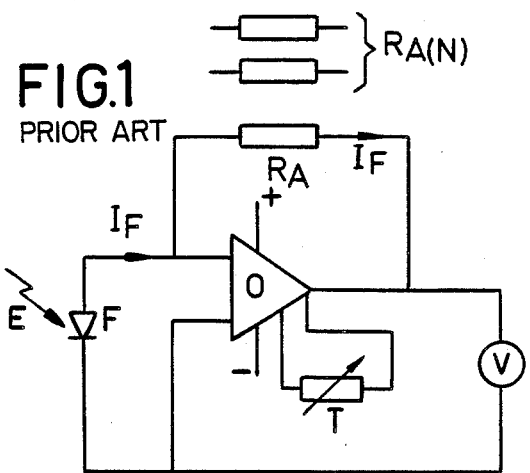
FIG. 1 shows schematically a circuit diagram for a known photometric circuit.

The cicuit shown in FIG. 1, comprises a photo-diode F and a voltmeter connected in parallel therewith. Before the voltmeter an operational amplifier O and a resistance $R_A$ are connected. The resistance can be exchanged with resistances of a different size for changing the measurement ranges. The circuit acts in such a way, that the photo diode F at exposure to the radiation E generates in its backward direction a photo-electric current $I_F$. The photo-electric current $I_F$ is passed on via the amplification resistor $R_A$ of the operational amplifier O. The generated voltage is indicated by the voltmeter V. This voltage is proportional to the radiation E provided that the resistance trimmer T is adjusted so that $$V = O \text{ when } E = O.$$

As this active amplification system is temperature-sensitive, the adjustment must be made manually or automatically at considerable cost.

Figure 2:
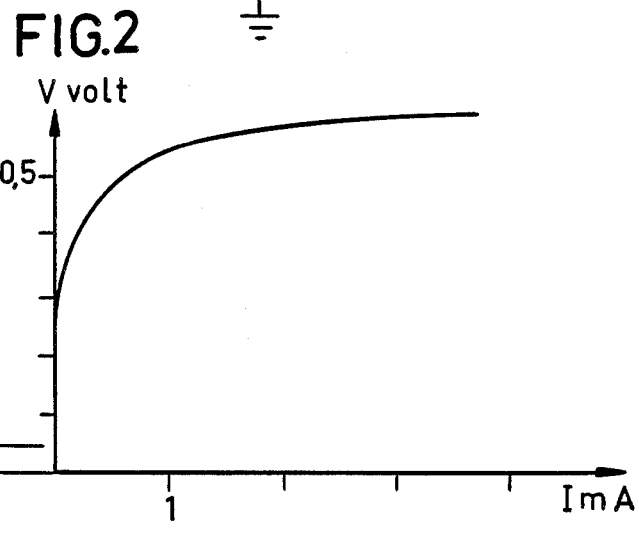
FIG. 2 shows the current-voltage characteristic of the photo-diode in the forward direction.

In FIG. 2 the current-voltage characteristic of the photo-diode is shown in the forward direction, i.e. opposed to the direction of the photo-electric current generation. It appears from FIG. 2 that at low voltage V in the forward direction the diode acts as an insulator. The resistance dV/dI is very high, near the origin of the coordinates. This applies especially to silicon diodes.

Figure 3:
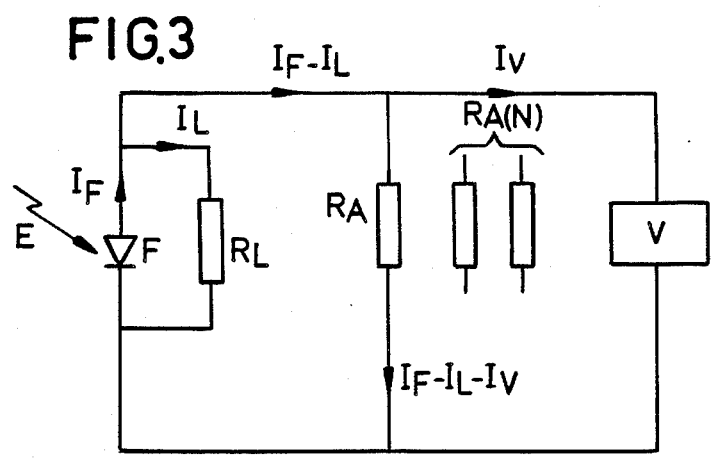
FIG. 3 shows a circuit diagram according to the present invention.

FIG. 3 shows the circuit according to the present invention. The voltmeter and the measurement resistor $R_A$ both are connected in parallel with the diode F. The measurement resistances can be exchanged automatically for changing the measurement ranges. The resistor $R_L$ illustrates the resistance in the barrier layer of the photo-diode in the conducting direction, i.e. slope dV/dI of the curve in FIG. 2.

$I_F$ is the photo-electric current in the backward direction of the diode generated by the radiation E. $I_L$ is the leakage current generated by the voltage V where $$V = R_A(I_F - I_L - I_V).$$

The leakage current is in the forward direction. $I_V$ is the very low leakage current through the modern voltmeter V. The magnitude for for the leakage current is one pico-ampere.

When the generated voltage V across the resistor $R_A$ is limited to the amplitude range $\Delta V$ in FIG. 2, below which the backward resistance $R_L$ can be regarded as much higher than $R_A$, therefore the leakage current $I_L$ is much less than the photoelectric current $I_F$, and when $I_V$ can be regarded as much lower than $I_F$, it applies that $I_F - I_V - I_L$ is approximately equal to $I_F$ and, thus, the generated voltage is approximately $$V = I_F \times R_A.$$

The voltmeter is adjusted so that maximum deflection is attained at a voltage equal to or lower than $\Delta V$. Calibration with a known radiation E can be carried out directly by adjustment of the voltmeter when $R_A$ is chosen so that $I_F \times R_A$ is lower than $\Delta V$.

For a silicon diode with a surface of some few mm² (e.g., 2.5 mm×2.5 mm) and adequate filtering, $I_F$ is approximately equal to 100 pA/lux or $I_F$ is approximately equal to 1000 pA/W/m² for ultra-violet or infrared radiation. At a voltage V=50 mV, $R_A$ quite simply can be chosen as 10MΩ without any non-linearity in the relation $$V = k \times E.$$

being noticeable, where k is a constant.

With this circuit, this, illumination intensities from 0.1 lux or radiation intensities in ultra-violet or infrared from 0.01 w/m² can be measured. For photo-diodes with a different surface area $\Delta V$ is to be chosen so that $$V = k \times E$$

constantly is substantially linear. At the measurement of higher radiation intensities $R_A$ is changed to lower resistance values $R_A(N)$ so that the voltage always is limited to $\Delta V$ or below.

The circuit according to the present invention implies substantial savings in material and labor costs and a superior simplicity of handling owing to the automatic zero-point stability. The voltmeter certainly may contain active amplification, but due to high-technology, the mass production modern voltmeters are zero-point stable at varying temperatures. Modern voltmeters, generally digital ones, also are well able to resolve voltages as small as have been reported here (for example 50 mV in two-thousand scale divisions).

I claim:

1. An electronic circuit for an instrument for indicating the intensity of light radiation, comprising:

a photo-diode means for generating a photo-electric current in response to light radiation incident thereon;

a measurement resistance means connected in parallel with the photo-diode means, said photo-electric current generating a voltage across said measurement resistance means, the amplitude of said voltage corresponding to the intensity of the incident light radiation; and a low leakage current voltmeter means connected in parallel with the photo-diode means and the measurement resistance means for measuring the voltage across the measurement resistance means which voltage across the measurement resistance means is equal to or less than a voltage amplitude at which a varying forward internal resistance of the photo-diode means has a substantially higher value than that of the measurement resistance means, thus making the leakage current of said photo-diode means substantially less than the current through said measurement resistance means;

such that the voltage amplitude across the measurement resistance means measured by the voltmeter means corresponds linearly to the photo-electric current generated by the photo-diode means.

* * * * *